July 25, 1967  R. H. BROADBENT  3,333,165
VENTED ELECTROLYTIC CAPACITOR WITH COATED CAPACITIVE UNIT
Filed Jan. 19, 1965
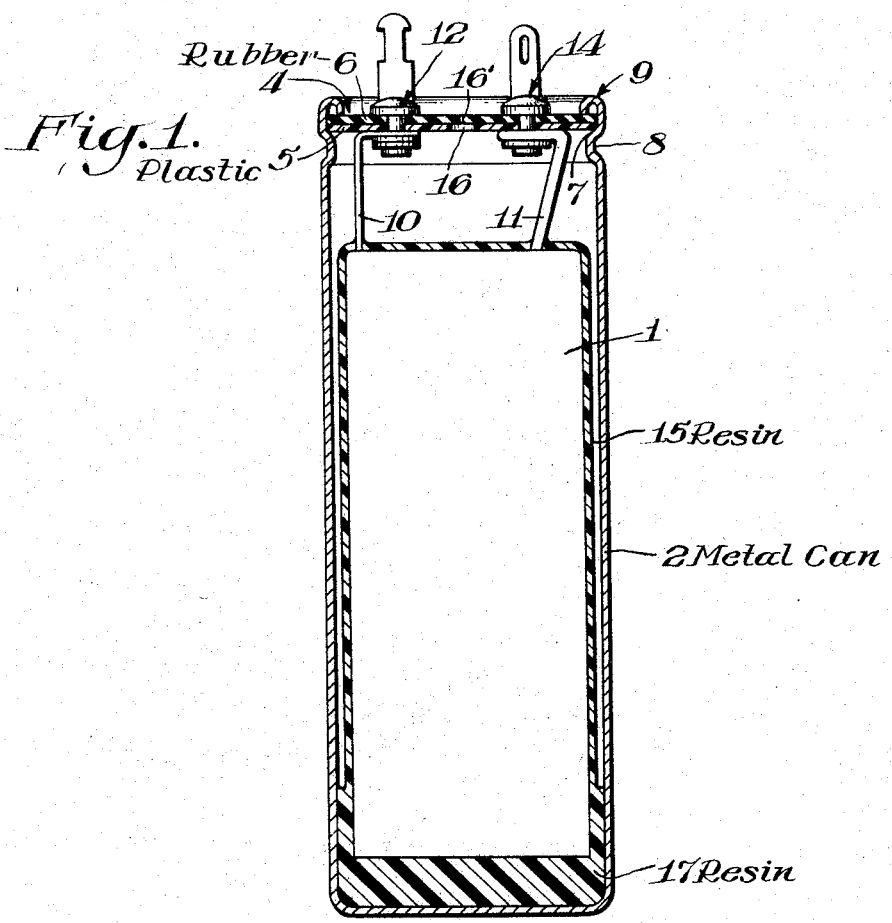
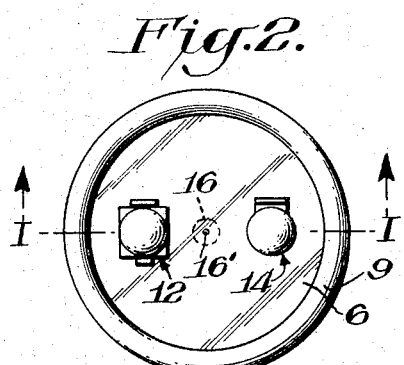
INVENTOR
Roy H. Broadbent
BY Connolly and Hutz
ATTORNEYS

United States Patent Office 3,333,165
Patented July 25, 1967

3,333,165
VENTED ELECTROLYTIC CAPACITOR WITH COATED CAPACITIVE UNIT
Roy H. Broadbent, Stoke Poges, Bucks, England, assignor to Sprague Electric Company, North Adams, Mass., a corporation of Massachusetts
Filed Jan. 19, 1965, Ser. No. 426,524
Claims priority, application Great Britain, Feb. 13, 1964, 6,039/64
6 Claims. (Cl. 317—230)

ABSTRACT OF THE DISCLOSURE

A capacitive unit is provided with an enveloping coating that is pervious to gas generated within the unit and at least substantially impervious to electrolyte within the unit. The coated capacitive unit is housed in a sealed container that is vented to relieve the generated gas pressure.

---

This invention relates to an electrolytic capacitor and more particularly to means for the retention of electrolyte therein.

In electrolytic capacitors, the capacitive element or unit comprises electrodes with absorbent separator material between them, the element being impregnated with liquid electrolyte which is retained in the separator. The capacitive element is enclosed within a container which conveniently comprises a cylindrical can, the open end of which can be closed by a composite disc or seal cap composed of a rubber layer and a rigid plastic, e.g., Bakelite layer. Connections for the capacitive element extend through the composite closure disc to terminals on its outer face. The composite closure disc can be held in place on an annular shoulder of the can by the spun-over rim of the open end of the can.

At high temperatures, of the order of 85° C. for example, there is a tendency for gas to develop within the capacitive element. The resultant internal pressures can be sufficient to cause the container to explode, and a means of escape for the gas has therefore to be provided.

In the construction described, the composite disc can be trepanned by formation of a small aperture in the Bakelite layer. The rubber layer can then balloon outwardly under the pressure of gas within the container, and eventually burst to release the gas if the pressure is sufficient. A rather extensive hole in the rubber layer may, however, result and this is disadvantageous as the electrolyte then tends to dry up during further use of the capacitor and its useful life is shortened.

Alternatively the container can be imperfectly sealed. The rim of the can for example might be spun down only lightly so that a vent path is provided around the edge of the composite disc. The sealing disc can instead be trepanned as in the previous arrangement but a hole pierced in the rubber, by means of a pin for example, in such a way as to remove no material. These methods too have their disadvantages. Although the container is not full of electrolyte, which is held in the absorbent separator, it can nevertheless seep out through the vent paths provided, particularly when the electrolyte is of low viscosity, as is frequently desirable.

It will be appreciated that these disadvantages are the more serious because capacitors are often mounted with the terminals, and thus the disc provided the gas escape path, downward. Moreover, the high temperatures, which cause the generation of the gas and so lead to the opening of the gas escape paths, also reduce the viscosity of the electrolyte and so increase the tendency for the electrolyte to drain away.

It is accordingly an object of this invention to provide means for overcoming the foregoing and associated difficulties.

Another object of this invention is to provide means for retaining the electrolyte within a capacitor whilst releasing gases therefrom.

These and other objects of this invention will become more apparent upon consideration of the following description in conjunction with the accompanying drawing, in which:

FIGURE 1 is a cross-sectional view through an electrolytic capacitor unit, taken on the line I—I of FIGURE 2; and FIGURE 2 is a plan view of the unit of FIGURE 1.

In general, the objects of this invention are attained by producing an electrolytic capacitor comprising a capacitive element impregnated with an electrolyte and housed within a container having means for relief of internal gas pressure, the capacitive element being coated with a material permeable to the gas but at least substantially impervious to the electrolyte.

The electrolytic capacitor of this invention is produced by impregnating an electrolytic capacitive element with electrolyte, coating the element with a substance forming with the electrolyte a material permeable by gas but at least substantially impervious to the electrolyte, and housing the element in a container having means for relief of internal gas pressure.

Particularly when the electrolyte is very mobile, the coating of this invention is desirably thickest at the end of the capacitive element which is lowermost in the position of use, as this is the end from which the electrolyte naturally tends to drain away.

The coating can be of sufficient thickness to extend to the adjacent wall of the container over at least a sufficient area to exert a restraining influence on movement of the element relative to the container. For example, a quantity of the initial coating material can be placed in the closed end of a container into which the coated element is subsequently placed. Under heat treatment a thick paste or gel is formed by the action of a small quantity of electrolyte from the element on the initial material in the can. This effectively fixes the element in the can.

The capacitor illustrated in the drawing comprises a capacitive element or unit 1 of generally cylindrical form housed within a container 2. The element is impregnated with a liquid electrolyte but the internal structure of the element, being no part of the present invention, is not indicated in the drawing. The container 2 is a metal can the open end of which is closed by a composite disc or seal cap 4 comprising an inner layer 5 of Bakelite and an outer layer 6 of rubber. The disc 4 rests on a shoulder 7 provided by an internal beading 8 and is secured by the spinning over of the rim of the can at 9 so that the spun over edge forms a seal with the rubber layer 6. Connecting wires or leads 10 and 11 extend from the element 1, to respective terminal assemblies 12 and 14 extending through the disc 4.

In accordance with the invention, the element 1 is provided with a coating 15 in the form of a thick paste or gel which is permeable by gas developed within the element but not by the liquid electrolyte.

The disc 4 is trepanned by the provision of an aperture 16 in the Bakelite disc 5 and the rubber layer adjacent this aperture is provided with a pinhole 16' preferably formed without removal of material. Gas developed in the element 1 can permeate the coating 15 to reach the space between the element 1 and container 2 and then escape by way of the pinhole 16' but there is no possibility that the element 1 will dry out and become ineffective due to escape of electrolyte, as the electrolyte cannot permeate the coating 15 to any significant extent.

In accordance with the invention, the coating 15 can be formed by providing the element 1 with an initial coating of a material which will absorb electrolyte to produce the final coating required.

A preferred material for the initial coating is ethyl hydroxy-cellulose but other materials, for example, starch and gum tragacanth are suitable. The thickening agents referred to in commonly assigned copending application S.N. 329,365 filed Dec. 10, 1963 can also be used.

Such materials in powder form can be applied to the elements immediately after impregnation, the moist surfaces of the element enabling the powder to adhere and form the desired coating. The powder can be applied by rolling the element 1 in the powder, or the powder can be blown on to the element by means of an insufflator. Powders such as ethyl hydroxy-cellulose which are available in a sufficiently fine state can be applied by dipping the element in a fluidized bed of the powder.

It will be noted that the coating 15 is thick enough at 17, at the lower end of the element 1, to fill the bottom of the container 1. The coating material is sufficiently viscous to secure the element within the container, and the extra thickness of the layer of material beneath the element provides additional security against the tendency for electrolyte to drain away under gravity, if the capacitor is mounted in the position shown in FIGURE 1.

The additional coating material at 17 is provided by placing initial material in the container 2 before the coated element is inserted. Heat treatment causes enough electrolyte to drain from the element to form with the additional initial material a mass of viscosity as high as that of the coating. If the initial material is starch, an almost rubber-like mass is formed with a conventional ammonium borate/glycol electrolyte at about 85° C. This material is too viscous to flow to the other end of the container, even if the capacitor is mounted with the terminals 12 and 14 downwards.

Leakage of electrolyte from containers provided with gas escape means of the kind described has been substantially eliminated by coating the element in accordance with the invention whilst any gases developed are readily released.

Obviously many modifications and variations of the present invention are possible in the light of the above teachings. It is, therefore, to be understood that within the scope of the appended claims the invention may be practiced otherwise than as specifically described.

What is claimed is:

1. An electrolytic capacitor comprising a container and a seal-cap closing the container, said seal-cap comprising means for relieving internal gas pressure in said container, a capacitive unit including an electrolyte and spaced electrodes contacting the electrolyte within said container, a coating of insulating material on the surface of and completely enclosing said unit, said coating being permeable to gas and at least substantially impervious to said electrolyte, and leads extending from said electrodes through said coating to terminals in said seal-cap.

2. An electrolytic capacitor as claimed in claim 1 in which the thickness of the coating is greatest at one end of said capacitive unit.

3. An electrolytic capacitor as claimed in claim 1 in which the coating is of sufficient thickness to fill the space between said capacitive unit and the adjacent wall of said container over at least a part of said capacitive unit.

4. An electrolytic capacitor as claimed in claim 3 in which said container comprises a tubular can having an integral closed end, and wherein said coating extends to the inner surface of said can over at least said closed end.

5. An electrolytic capacitor as claimed in claim 1 in which said seal-cap comprises a composite disc having a rigid plastic layer and a rubber layer, said plastic layer having an aperture exposing a pinhole in said rubber layer to vent gas pressure from within said container.

6. An electrolytic capacitor as claimed in calim 1 in which said seal-cap comprises a disc retained by a spun-over rim of said container, a vent path for relief of gas pressure being provided around the edge of said disc.

References Cited

UNITED STATES PATENTS

| | | | |
|---|---|---|---|
| 2,224,307 | 12/1940 | Linder | 317—230 |
| 2,266,523 | 12/1941 | Waterman | 317—230 |
| 2,806,982 | 9/1957 | Holik et al. | 317—230 |

JAMES D. KALLAM, *Primary Examiner.*